United States Patent Office 2,990,145
Patented June 27, 1961

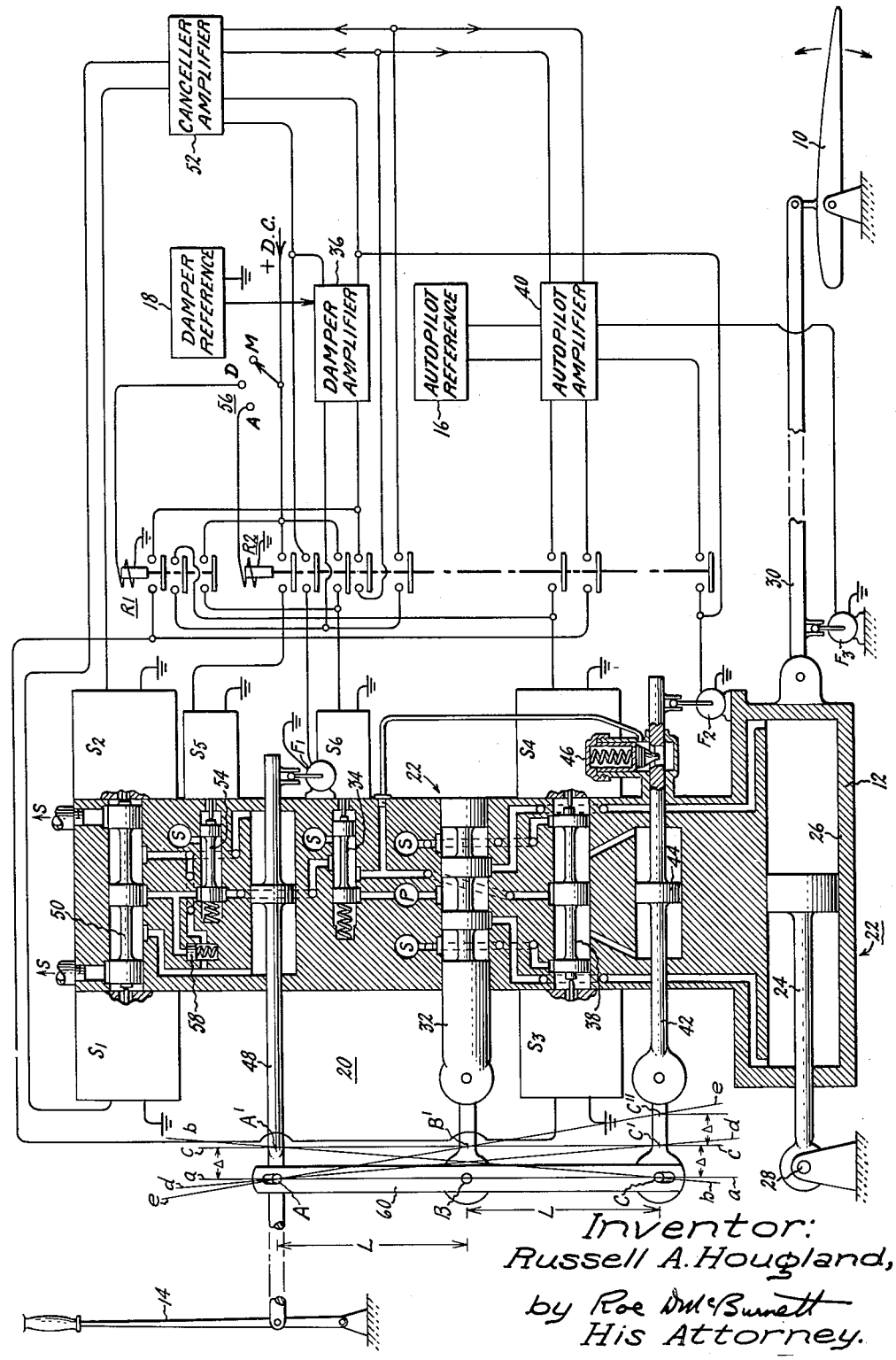

2,990,145
INTEGRATED HYDRAULIC POWER ACTUATOR
Russell A. Hougland, Scotia, N.Y., assignor to General Electric Company, a corporation of New York
Filed Nov. 5, 1956, Ser. No. 620,246
5 Claims. (Cl. 244—78)

The present invention relates to an integrated hydraulic power actuator and more particularly to an integrated hydraulic power actuator adapted for combined manual and automatic control of the direction of travel or of the attitude of flight of an aircraft vehicle.

In the control of modern high speed dirigible vehicles, such as aircrafts, at speeds approaching and sometimes exceeding the speed of sound, the forces required at the control surfaces of the vehicle frequently exceed those which the pilot is capable of supplying for a sustained period without excessive fatigue. Also, the persent trend in transonic and supersonic aircraft design is towards progressively thinner wings and smaller aerodynamic control surfaces in order to achieve an aerodynamically efficient high speed vehicle. This trend is resulting in marginal stability under certain flight conditions, such as the phenomena of "Snaking," a directional oscillation, and "Dutch" Roll, a combination of lateral and directional oscillation. Therefore, the most important single remedy for this situation is to equip the aircraft with an autopilot which improves the airplane's stability in these critical flight conditions with a minimum increase in drag. In this manner, two important advantages are achieved, whereby the airplane becomes a stable weapons platform under all flight conditions and the airplane's flying characteristics in these critical flight conditions are greatly improved.

Further, the use of an autopilot in a modern high speed aircraft performs a relief in maneuvering function where a multiplicity of tasks stress the ability of the pilot. Hence, to assist the pilot in his task the autopilot is designed to maintain attitude, altitude and/or heading constant and to be able to tie-in with both navigational and fire-control systems. Accordingly, the autopilot performs a maneuvering function which the human pilot may find difficult or even impossible. Thus, it can be seen that the modern autopilot should perform an important damping function as well as a relief and manuvering function in every phase of the high speed aircraft mission from take-off to landing.

The conventional autopilot or fully-powered flight control system contains a power control actuator which moves the control surface in response to mechanical inputs, and normally has three operational modes, the damping mode, autopilot mode and a fully automatic mode. These mechanical inputs may be manual, such as pilot initiated, or automatic which are initiated by the autopilot and/or the damper systems. Generally, the autopilot signals for changing the aircraft's path are put in through an actuator parallel with the pilot's input so that the control stick will move in conjunction with the autopilot input. The damper signals for damping the aircraft's oscillations are added by another separate actuator in series with the pilot's input so that the control stick will not move in response to damping inputs.

Generally, damping is accomplished about each aircraft axis by automatically displacing the appropriate control surface of the aircraft to oppose undesirable angular rates. When the autopilot is engaged, sensing elements such as conventional vertical sygroscopes and heading gyroscopes are added to the damper mode configuration, so that signals proportional to any deviation from the engaged attitude are developed which enable the autopilot to maintain the attitude established at the time of autopilot engagement. In he fully automatic mode, the flight path is automatically controlled by navigational equipment and the pilot merely monitors the system.

At the present time, a number of schemes for combining the functions of these actuators in one unit have been devised, however, these schemes have had one of two major disadvantages. Either the control stick moves in response to damping signals, in fully automatic modes of operation, or the stick will not move in response to any signals, either autopilot or damper signals. The first scheme consists in essence of adding a parallel actuator only to the power control actuator; while the second scheme consists of adding a series actuator only to the power control actuator. Both of these schemes are in present use or are being considered for use; however, neither meets fully the desired requirements of high speed aircraft for a single compact light-weight package without the above stated two major disadvantages.

The present invention consists of an integrated hydraulic power actuator for use in aircraft surface control systems wherein an irreversible power control actuator with mechanical feedback, an autopilot actuator, and a canceller or damper actuator are integrated into one compact lightweight package. The piston of the power control actuator is pivotally secured to the airframe of the aircraft and the remaining portion of the integrated hydraulic power actuator moves and positions the control surface of the aircraft. In this manner, a single package assembly offers the possibility for space and weight saving in the total component weight, and more important, an appreciable saving in weight in the required hydraulic plumbing and in the control linkage system.

The reliability of the over-all control system is further increased by the reduction in the number of hydraulic and mechanical connections. Also, it is desirable and quite advantageous to have the damper actuator as close to the power control valve as possible to reduce the static and dynamic forces opposing the damping motion which would otherwise tend to reflect this damping motion back through the control system to the control stick. Further, backlash between the damper actuator and the power control valve can be minimized to improve the performance of the system when operating in the damper mode.

The principal advantages of the present integrated hydraulic power actuator are that the autopilot and damper actuators are independent of each other. In this manner, autopilot inputs are reflected to the control stick where they can be monitored by the pilot while damping inputs are not reflected to the control stick. Damping signals are generally of small amplitude and relatively high frequency, and if reflected to the stick, they can be quite distracting to the pilot. Further, the pilot's own inertia and reflexes would oppose these damping motions, thus impairing the performance of the damper system. Therefore, since the autopilot actuator is independent of the damper actuator, it may be used, with other components in the system, to provide the desired "feel" forces in the control system. Also, by application of moderate control stick forces, the pilot can over-power the full authority parallel actuator and maintain full control of the control surface.

An object of the present invention is the provision of an integrated hydraulic power actuator for use in aircraft surface control systems for the control of the direction of travel and/or the attitude of the aircraft.

Another object is to provide an integrated hydraulic power actuator for use in aircraft surface control systems wherein damping signals are not reflected to the control stick.

A further object of the invention is the provision of an integrated hydraulic power actuator for use in aircraft surface control systems wherein the damping signals are not reflected to the control stick while autopilot signals are transmitted thereto.

A still further object of the present invention is the provision of an integrated hydraulic power actuator for use in aircraft surface control systems wherein the autopilot and damper actuators are independent of each other.

Other objects and many of the other attendant advantages of this invention will be readily appreciated as the same becomes better understood by reference to the following detailed description when considered in connection with the accompanying drawing in which like reference numerals designate like parts throughout the figure thereof and wherein:

FIGURE 1 is a schematic diagram of a preferred embodiment of the invention wherein the aircraft surface control system's actuator components are combined in a single package.

Referring now to the drawing, there is illustrated a preferred embodiment with a control surface 10, such as may be positioned by the integrated actuator of this invention, and which is connected through a suitable linkage for actuation by a power control actuator indicated at 12 in response to manual input signals which may be provided by movement of a manual lever 14, or in response to automatic flight control signals which may be provided from an autopilot reference and a damper reference indicated at 16 and 18, respectively. The manual signals from lever 14 and the automatic signals from autopilot reference 16 and damper reference 18 are supplied to the integrated hydraulic power actuator systems generally indicated at 20 for the control of the power control actuator 12.

The integrated actuator system 20 consists of a unitary housing 22 containing the power control actuator 12 which is provided with a power piston 24 slideably coacting with a power control sleeve 26 integrally formed in the housing. The power piston 24 is provided with one end thereof extending outside said unitary housing 22 and pivotally mounted at 28 to the frame of the aircraft. A control shaft 30 is provided with one end pivotally mounted to the power control actuator 12 and the other end pivotally coupled to the control surface 10 to thereby actuate the surface in response to movement of the unitary housing from the pivot point 28.

A power valve piston 32 is provided slideably mounted within said housing 22, and formed with a plurality of lands so as to suitably control the flow of fluid under pressure therethrough. The power valve piston 32 is hydraulically coupled to each end of the power control actuator 12 to control the flow of fluid therein from a high pressure source "P."

A conventionally constructed shut-off valve 34, operative within the housing 22, is actuated by a solenoid $S_6$, energized through a mode switch 56, for controlling the flow from the high pressure source "P" to an autopilot control valve 38 which is axially actuated in response to solenoids $S_3$ and $S_4$ reacting to electrical signals received through an autopilot amplifier 40 or through the damper amplifier 36.

An autopilot piston 42 having a single land 44 is slideably mounted within the housing 22 and hydraulically controlled through the autopilot control valve 38 in response to autopilot reference signals. A lock mechanism 46 as disclosed and claimed in copending application Serial No. 476,257 filed December 20, 1954 by Horace H. Christensen, and assigned to the assignee of the instant application, now Patent No. 2,819,031 issued January 7, 1958, is provided, fixed to the housing 22, to lock the autopilot piston 44 in its null or neutral position in response to actuation of the shut-off valve 34.

A canceller piston 48 is provided slideably coacting with the housing 22 in response to a canceller control valve 50 which, in turn, is actuated axially by solenoids $S_1$ and $S_2$ in response to electrical signals from a canceller amplifier 52. A shut-off valve 54, structurally similar to the shut-off valve 34, is provided to control the flow of high pressure fluid to the canceller valve 50 in response to actuation of a solenoid $S_5$ energized through a mode switch 56. A by-pass valve 58, normally open, is provided between canceller control valve 50 and the canceller piston 48 to by-pass fluid flow from one side of the canceller piston to the other in manual or damping operation modes. In automatic mode, high pressure fluid from shut-off valve 54 closes by-pass valve 58 to permit actuation of piston 48 by canceller control valve 50.

The manual position signal input stick 14 is pivotally connected to and correspondingly moves with the canceller piston 48. A control lever 60 is provided to mechanically couple the respective end extensions of autopilot piston 42 and power valve 32 to the canceller piston shaft 48 so as to correlate any action therebetween as hereinafter disclosed in the operation of the system 20.

A number of feedback or follow-up mechanisms are provided in the system 20, such as synchro $F_1$, or the like, which is electricaly coupled through a relay $R_2$ to the damper amplifier 36 and to the canceller amplifier 52 to cooperate therewith for closed loop control of the canceller piston 48. Further, a synchro $F_2$ is electrically coupled to the damper amplifier 36 and canceller amplifier 52 and through relay $R_2$ to the autopilot amplifier 40, and a synchro $F_3$ is electrically coupled to the autopilot amplifier. A number of relays, such as $R_1$ and $R_2$, are provided which are electrically energized through the mode switch 56 to activate the various solenoids and follow-up mechanisms to provide the mode of operation desired.

In the operation of the aircraft surface control system 20, for straight manual operation, wherein the mode switch 56 is set at M, the lock 46 engages the autopilot piston 42 to fix it relative to the housing 22. The by-pass valve 54, across the canceller piston 48, is open and allows the canceller piston to move freely back and forth within the housing 22 without hydraulic restraint. Thus, if the input stick 14 is actuated to impose a step input of displacement, Δ, to the right on the canceller piston 48, the control lever 60 will pivot about pin C from a position (aa) to position (bb) and displace the power valve piston 32 to the right. This displacement puts high pressure oil from source P through the power valve piston 32 to the right side of power piston 24 and causes the housing 22 to move to the right relative to the pivot point 28.

As the housing 22 moves, it carries the pin C to the right, and the link 60 now pivots about point (A'). When the housing 22 has moved an amount, Δ, from the initial position of pin C, the lever 60 is in the position cc and the power valve piston 32 is recentered with respect to the supply and drain ports associated therewith. The centering of the power valve piston 32 stops the flow of oil to the power piston 24 and stops the relative movement of the housing 22 with respect to pivot point 28. Thus, a 1-to-1 fedback ratio is provided between the input at the control stick 14 and the output at the control surface 10.

In the damping mode of flight control operation of the system 20, wherein the mode switch is set at D, the lock 46 on the autopilot piston 42 is disengaged by actuation of the shut-off valve 34 while the by-pass valve 58 across the canceller piston 48 remains open. The position of the autopilot piston 42, relative to the housing 22 is determined by the operation of a closed loop system consisting of the damper amplifier 36 and its reference input 18, the autopilot control valve 38, the autopilot piston 42 and the autopilot follow-up $F_2$. This is for all practical purposes a rigid system, as far as manual inputs from the control stick 14 are concerned, wherein the pin C is fixed, at any instant, relative to the housing 22.

However, damping motions may be introduced to the autopilot piston 42 without causing the control stick 14 to move. If the autopilot piston 42 is caused to move to the right of an amount, Δ, the control lever 60 will pivot about pin A, which as far as the damping motions are concerned, is fixed to the airframe due to pilot forces, friction, feel loads, and other such related forces.

Hence, the link 60 will rotate from position *aa* to position *dd* and thereby move the power valve 32 to the right. Thus, high pressure oil from P is ported to the right side of the power piston 24, causing the unitary housing 22 to move to the right and, in turn, actuate the control surface 10 accordingly. When the housing 22 has moved to the right an amount, Δ, the pin C will have moved to the right an amount, 2Δ, due to the initial displacement Δ of the autopilot piston 42 plus another distance Δ because of the displacement of the unitary housing assembly 22.

If the lengths (L) of the link 60 are equal, point B' will be to the right of pivot B an amount, Δ. Since this is the same amount as the housing 22 has been displaced to the right, the power valve piston 32 is now recentered with respect to its cooperating ports, and the flow of oil to the power piston 24 is stopped. In this manner, mechanical feedback occurs betwen the input and output signals, and the damping input causes movement of the unitary housing 22 and the control surface 10 operatively coupled thereto, without the transmission of motion to the control stick 14. Also, it will be obvious that the displacement authority of the damping motion is limited by the amount of autopilot piston 42 motion allowed in the control system 20.

The desired damping inputs generally require rapid motion of the control surface 10 with very limited stroke action. Thus, the amount of control surface travel which the damping system can introduce is limited. The pilot's input, through the control stick 14, is added to the desired damping input in combined operations, whereupon the control surface output is the algebraic sum of the pilot and damping inputs. In all of the above described operations, canceller piston 48 is free to move relative to the housing 22 by virtue of the by-pass valve 58 being open.

In autopilot operation wherein the mode switch 56 is set at contact A, it is necessary to be able to move the control surface 10 from one extreme deflection to the other, and also desirable to have the control stick 14 follow the control surface movement caused by the autopilot reference inputs. In the preferred embodiment of the present invention, this is accomplished by the provision of a canceller control valve 50 with a cenceller follow-up $F_1$ providing a means of positioning the pin A relative to the unitary housing 22 through the canceller piston 48.

When the mode switch 56 is set at contact A, relay $R_2$ is energized and electric power is supplied to solenoids $S_5$ and $S_6$. Shut-off valves 34 and 54 thus allow high pressure oil to flow to the autopilot control valve 38, the locking mechanism 46, the canceller control valve 50, and the by-pass valve 58. The by-pass valve is now closed and prevents the free passage of oil from one side to the other of canceller piston 48.

The position of the canceller piston 48, relative to the housing 22, is determined by the closed loop ssytem consisting of the canceller amplifier 52, the damper amplifier 36 and its reference input 18, the canceller control valve 50, the canceller piston 48, and the canceller follow-up $F_1$. This is for all practical purposes a rigid system, as far as motion of the link 60 is concerned, wherein the pin A is fixed, at any instant, relative to the housing 22. If no input signal is introduced into the canceller amplifier 52, the canceller piston 48 will be centered relative to the housing 22.

Signals from the autopilot reference 16 are fed to the autopilot amplifier 40 and, in turn, to the autopilot control valve 38 through the solenoids $S_3$ and $S_4$. The autopilot piston 42 is positioned in response to the flow of oil from the autopilot control valve 38. Motion of the autopilot piston will cause link 60 to pivot about pin A, which is fixed rigidly to the housing 22 by the action of the canceller servo loop. Displacement of link 60 causes the power valve 32 to move and allow high pressure oil to flow to one side of the power piston 24. As the housing 22 moves, the pins A, B, and C move with it and maintain the same relative position with respect to the housing. In this manner, the control stick 14 is moved in correspondence with the motion of the power control actuator 12.

When the power control actuator has moved a sufficient amount, the feedback signal from follow-up $F_3$, cancels out the input reference signal, and the autopilot amplifier 40 causes the autopilot piston 42 to be recentered with respect to the housing 22. In turn, the power valve piston 32 is now recentered with respect to its co-operating ports, and the flow of oil to the power piston 24 is stopped. In this mode of operation, the follow-up $F_2$ may be used to supply a rate feedback signal for stabilization of the autopilot loop.

For fully automatic control, the desired damping and autopilot signals are added algebraically and fed to the autopilot control valve 38. This would normally cause the control stick 14 to follow both the autopilot and the damping motions of the power control actuator 12. To prevent the damping motions from being reflected to the control stick, the damping signals from the damper amplifier 36 are also fed into the canceller amplifier 52, where they are properly shaped, and then fed to the damper control valve 50 through solenoids $S_1$ and $S_2$.

The canceller piston 48 is accordingly positioned with respect to the housing 22 with reference to these modified damping signals. Thus, the operation is such that as the power control actuator 12 moves to the right at a velocity ($v$), due to a damping signal input, the canceller piston 48 is caused to move to the left at the same velocity ($v$) relative to the power control actuator 12. The net result is that the pin A remains fixed relative to the airframe of the aircraft, and no damping motion is reflected to the control stick 14.

Further, since autopilot signals are not fed to the canceller control valve 50, the canceller piston 48 will remain fixed with respect to the housing 22 for these autopilot signals. Consequently, pin A will remain fixed relative to the housing 22 for autopilot signals and will drag the control stick 14 along with the unitary housing 22. Accordingly, the canceller piston 48 is fundamentally introduced into the system 20 to cancel out the undesired damping motions and to prevent the transfer or feeding-back of such motions to the control stick 14.

It is of course understood that the linkage configuration of the preferred embodiment can be varied to change the feedback ratio, and the integrated hydraulic power actuator can also be constructed, in accordance with the principles of the present invention, to accommodate dual power systems in a single compact and light-weight package. The by-pass valve 58 can be designed to serve a dual purpose as an over-power valve enabling the pilot to move the piston 48 at any time by application of a sufficiently high manual force.

It should be understood, of course, that the foregoing disclosure relates to only a preferred embodiment of the invention and that it is intended to cover all changes and modifications of the example of the invention herein chosen for the purpose of the disclosure, which do not constitute departures from the spirit and scope of the invention as set forth in the appended claims.

What is claimed is:

1. A combined manual and automatic hydraulic control system for positioning an aircraft's control surface comprising a movable hydraulic power actuator unit coupled to the control surface to be positioned, a power piston having one end secured to the aircraft and slideably coacting with said power actuator unit, a power valve piston slidably mounted in said actuator unit and hydraulically coupled to said power piston to control upon adjustment away from a neutral position the movement of said actuator unit, a control lever pivotally connected to one end of said power valve for controlling the flow of fluid therethrough to move said actuator unit, a manual input stick pivotally coupled to said control lever, a canceller piston slideably mounted within said actuator unit and pivotally connected to said control lever, a canceller control valve including a first pair of electrical solenoids for the positioning thereof within said actuator unit to control the flow of fluid to said canceller piston, a first automatic electrical control apparatus for energizing said first pair of solenoids in response to a modified damping signal, an autopilot piston slideably mounted within said actuator unit and pivotally connected at one end to said control lever, an autopilot control valve including a second pair of electrical solenoids for the positioning thereof within said actuator unit to control the flow of fluid to said autopilot piston, a second automatic electric control apparatus for energizing said second pair of solenoids in response to damping and autopilot signals, and follow-up means coupled to each of said canceller and autopilot pistons for synchronizing the movement thereof relative to said respective signals.

2. An integrated hydraulic power actuator adapted for combined manual and automatic flight control of an aircraft comprising a power control actuator, an autopilot actuator and a canceller actuator in operating relationship with said power control actuator, said canceller actuator comprising a canceller control valve responsive to electrical signals to position a canceller piston, a power valve responsive to movements of said autopilot and canceller actuators to activate said power control actuator in response to autopilot and damping reference signals, a control stick operatively coupled to said power control actuator for introducing manual inputs thereto, and means including said canceller actuator and said canceller piston for preventing movement of said control stick as a result of said damping reference signals.

3. An integrated hydraulic power actautor for combined manual and automatic control of an aircraft surface comprising a power control actuator having a slideable piston with one end thereof secured to the aircraft, damping means operatively actuating said power control actuator for opposing undesirable angular rates about each axis of the aircraft, autopilot means actuating said power control actuator in response to signals proportional to deviations from a predetermined attitude, unitary housing means operatively containing said damping and autopilot means and responsive to actuation of said power control actuator, the control surface operatively connected to said unitary housing means and actuated thereby in response to said damping and autopilot means, a control stick for manual displacement of said unitary housing means and the control surface, and means for preventing disturbance of said control stick by such movement of said power control actuator as is caused by said damping means whereby said control stick is solely responsive to movement of the control surface by said autopilot means.

4. An integrated hydraulic power actuator for application in aircraft surface control systems comprising an irreversible power control actuator, an autopilot actuator and a canceller actuator combined with said power control actuator into a movable unitary unit, external linkage means operatively coupling said actuators together and with a pivoted manual control stick. said power control actuator having a coacting piston with one end thereof pivotally secured to the frame of the aircraft, a control surface operatively connected to said power control actuator for movement in proportion to the displacement of said actuator from the pivoted end of said piston in response to selective signal inputs from said autopilot and canceller actuators and said manual control stick, and said linkage operatively associated with a mechanical feedback operatively coupled to said movable unitary unit for neutralizing the movement thereof by said power control actuator.

5. The invention as defined in claim 4 but further characterized by said canceller actuator comprising a damper reference input, a damper amplifier electrically coupled to said reference input, a canceller amplifier operatively coupled to said damper amplifier for modifying the input thereof, a canceller control valve operatively responsive to signal inputs from said canceller amplifier, a canceller piston connected to said external linkage means and operatively responsive to said canceller control valve, and a canceller follow-up actuated by said canceller piston and electrically coupled to said canceller amplifier for stabilizing the canceller actuator loop.

References Cited in the file of this patent

UNITED STATES PATENTS

| 2,678,177 | Chenery et al. | May 11, 1954 |
| 2,824,712 | Rasmussen et al. | Feb. 25, 1958 |
| 2,859,926 | Westbury | Nov. 11, 1958 |
| 2,877,968 | Granan et al. | Mar. 17, 1959 |

FOREIGN PATENTS

| 588,929 | Great Britain | June 6, 1947 |